(12) United States Patent
Meloche et al.

(10) Patent No.: US 7,821,936 B2
(45) Date of Patent: Oct. 26, 2010

(54) SYSTEMS AND METHODS FOR PARTITIONING END-TO-END PERFORMANCE EFFECTS USING NETWORK TOMOGRAPHY

(75) Inventors: Jean Meloche, Madison, NJ (US); Lorraine Denby, Berkeley Heights, NJ (US); Colin L. Mallows, Flemington, NJ (US); James M. Landwehr, Summit, NJ (US)

(73) Assignee: Avaya Inc., Basking Ridge, NJ (US)

( * ) Notice: Subject to any disclaimer, the term of this patent is extended or adjusted under 35 U.S.C. 154(b) by 514 days.

(21) Appl. No.: 11/829,429

(22) Filed: Jul. 27, 2007

(65) Prior Publication Data

US 2009/0028062 A1    Jan. 29, 2009

(51) Int. Cl.
G08C 15/00 (2006.01)
H04J 1/16 (2006.01)
H04J 3/14 (2006.01)
H04L 1/00 (2006.01)
H04L 12/26 (2006.01)

(52) U.S. Cl. .................. 370/231; 370/230; 370/229; 705/35

(58) Field of Classification Search .............. 370/231, 370/230, 229; 705/35
See application file for complete search history.

(56) References Cited

U.S. PATENT DOCUMENTS

| 5,343,389 | A  | * | 8/1994 | Otvos ..................... 436/173 |
| 2004/0015460 | A1 | * | 1/2004 | Alhadef et al. ............. 706/16 |
| 2005/0128943 | A1 | * | 6/2005 | Gibbs et al. ............... 370/229 |
| 2005/0207349 | A1 | * | 9/2005 | Nagami et al. ............. 370/241 |
| 2006/0053074 | A1 | * | 3/2006 | Wilton et al. .............. 705/35 |
| 2008/0114721 | A1 | * | 5/2008 | Jones et al. ............... 707/2 |

* cited by examiner

*Primary Examiner*—William Trost, IV
*Assistant Examiner*—Kyle C Kasparek
(74) *Attorney, Agent, or Firm*—Muncy, Geissler, Olds & Lowe, PLLC

(57) ABSTRACT

Systems and methods are presented for partitioning end-to-end performance effects using network tomography. In one embodiment, a method for partitioning end-to-end performance effects within a network is presented. The method includes determining a network topology between at least two test points, obtaining an unrelated approximation of edge effects between the test points, measuring end-to-end performance data between the test points corresponding to a target application, regularizing an estimate of edge effects for the target application using the unrelated approximation of edge effects, and computing the estimate of edge effects for the target application to partition the end-to-end effects.

25 Claims, 6 Drawing Sheets

100

200

$$R_1 = \begin{pmatrix} 1 & 1 & 0 \\ 1 & 0 & 1 \end{pmatrix}$$

$$T_1 = \begin{pmatrix} 1 & 0 & 0 \\ 1 & 1 & 0 \\ 1 & 0 & 0 \\ 1 & 0 & 1 \end{pmatrix} \begin{matrix} \text{BLOCK} \\ 1 \\ \text{BLOCK} \\ 2 \end{matrix}$$

$$R_2 = \begin{pmatrix} 1 & 1 & 0 & 0 & 0 & 0 \\ 1 & 0 & 1 & 0 & 0 & 0 \\ 0 & 0 & 0 & 1 & 0 & 1 \\ 0 & 0 & 1 & 1 & 0 & 0 \\ 0 & 0 & 0 & 0 & 1 & 1 \\ 0 & 1 & 0 & 0 & 1 & 0 \end{pmatrix}$$

600

```
S = set of test points

STEPS 1 and 2:
    for a in S:
        for b in S:
            perform traceroute from a to b compute T = partial paths routing matrix from traceroute results
    compute R = end-to-end routing matrix from traceroute results
    compute β₀ = independent approximation from traceroute results STEP 3:
    for a in S:
        for b in S:
            perform target application measurement from a to b STEP 4:
    Compute β = reliable estimate from target application results and β₀
```

Fig. 6

SYSTEMS AND METHODS FOR PARTITIONING END-TO-END PERFORMANCE EFFECTS USING NETWORK TOMOGRAPHY

BACKGROUND OF THE INVENTION

1. Field of the Invention

Embodiments of the invention generally relate to techniques for the analysis and/or monitoring of data networks, and more particularly, analyzing the performance of networks for various applications. Specifically, various embodiments described herein are directed to determining edge effects occurring within a network based upon end-to-end performance measurements.

2. Description of the Background Art

The ongoing improvements in the reliability, performance, and cost-effectiveness of modern data networks are motivating a demand for their use in a variety of communication applications. This success has contributed to the increasing size and complexity of the data networks, as well as the expectation among their users for consistently high levels of quality when using sophisticated applications, such as, for example, Voice over Internet Protocol (VoIP) telephony and/or video communications. Given the complexity and dynamic nature of these networks, assessing and monitoring the network's performance can present a number of challenges. Network engineers designing and running networks may utilize data collection and analysis tools to assess Quality-of-Service (QoS) measures such as packet loss rates, delays, and jitter, and for doing network bandwidth calculations. This information can be utilized for several reasons, such as: monitoring network performance and utilization over time; drilling into problems and finding their causes; detecting congestion; planning capacity and network provisioning; and for ensuring compliance with service level agreements.

Such data collection and analytical tools are especially useful with real-time applications that require high and sustained levels of quality, such as, for example, VoIP, video streaming, video-conferencing, and/or on-line games. Determining the performance of networks for such real-time applications can be challenging for a variety of reasons. Once such reason is that the size of network can limit the type of analyses that can be performed in practice. Another reason is that networks are evolving entities and QoS characteristics can change rapidly, for example, as a result of load or as a result of an automatic process that is attempting to circumvent some local network problem. Yet another reason is that network engineers often do not have access to all the relevant components in the network, for example, a node within a network may belong to a different administrative domain, or a network segment can belong to an Internet Service Provider.

Traditional approaches to network analysis have relied on detailed queuing models at the individual router level. However, such "local" modeling may not adequately capture the complexities and dynamic behavior of modern networks, including the fact that end-to-end results can be affected by interactions between adjacent and non-adjacent network components. Expanding such local models to incorporate the behavior of even a moderately sized network may be impractical because of the very large number of potential interactions.

Accordingly, it would be beneficial to apply improved network analysis and/or monitoring techniques for locating problems within a network and quickly assessing the network's performance at a detailed level.

BRIEF SUMMARY OF THE INVENTION

Various embodiments of the invention are presented herein which can address the above mentioned issues associated with the existing technology. Embodiments consistent with the present invention are directed to systems and methods for partitioning end-to-end effects using network tomography.

In one embodiment, a method for partitioning end-to-end performance effects within a network is presented. The method includes determining a network topology between at least two test points, obtaining an unrelated approximation of edge effects between the test points, measuring end-to-end performance data between the test points corresponding to a target application, regularizing an estimate of edge effects for the target application using the unrelated approximation of edge effects, and computing the estimate of edge effects for the target application to partition the end-to-end effects.

Another embodiment presents a method for determining an unrelated approximation of edge effects within a network. This embodiment includes collecting traceroute data between at least two test points, determining a partial path routing matrix based upon the traceroute data, determining intermediate round trip times based upon the traceroute data, performing isotonic regression on the intermediate round trip times to obtain a non-decreasing sequence, computing edge effects by subtraction of successive results of the non-decreasing sequence, and combining the edge effects of values which correspond to a same edge to remove redundant measurements.

Yet another embodiment presents a method for partitioning end-to-end effects within a network. This embodiment includes collecting traceroute data between the at least two test points, determining an end-to-end routing matrix between the at least two test points using the traceroute data, obtaining an unrelated approximation of edge effects between the test points using the traceroute data, measuring end-to-end performance data between the test points corresponding to a target application, and computing an estimate of edge effects for the target application by utilizing the unrelated approximation of the edge effects as a regularization term.

Another embodiment presents an apparatus for partitioning end-to-end performance effects within a network. The apparatus includes a memory storing a set of instructions, and a processor executing the stored set of instructions for determining a network topology between at least two test points, obtaining an unrelated approximation of edge effects between the test points, measuring end-to-end performance data between the test points corresponding to a target application, regularizing an estimate of edge effects for the target application using the unrelated approximation of edge effects, and computing the estimate of edge effects for the target application to partition the end-to-end effects.

BRIEF DESCRIPTION OF THE DRAWINGS

Further aspects and advantages of the present invention will become apparent upon reading the following detailed description taken in conjunction with the accompanying drawings summarized below.

FIG. 6 shows pseudo-code for an exemplary method of determining edge effects for a target application.

DETAILED DESCRIPTION

Embodiments consistent with the present invention are more specifically set forth in the following description with reference to the appended figures. Wherever possible, the same reference numbers will be used throughout the drawings to refer to the same or like parts. Additionally, well-known elements of the invention will not be described in detail or will be omitted so as not to obscure the relevant details of the invention.

The term "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

As used herein, the term "network tomography" is used to describe a class of algorithms which may deduce internal characteristics of a network based upon aggregate information derived and/or measured from two or more network test points. The internal characteristics determine the end-to-end network performance, and accordingly network tomography may be thought of as an inverse problem for recovering internal characteristics of the network from the end-to-end measurements.

The term "network application," or simply "application," as used herein refers to any mode of utilization of a network which is employed by a user, and can include, for example, video streaming, video-conferencing, on-line games, and/or VoIP.

A network may be represented by a directed graph which may include a set of nodes and edges, wherein the edges may serve as interconnections between pairs, of nodes. The manner in which all of the nodes are interconnected may be referred to as the topology of the network. When information is sent from one location to another in the network, the information may first be broken into pieces, and then bundled with additional ancillary data to form a packet. The ancillary data may include origin-destination data, reassembly instructions, and/or error correction data. Packets traverse through the data network along data paths. A data path may be defined as a sequence of ordered edges which indicate the transmission route when a packet travels between communication endpoints within the network.

Figure 1:
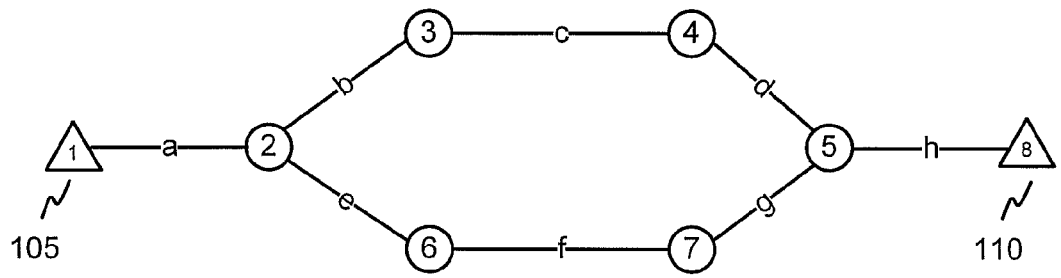
FIG. 1 shows a diagram illustrating an exemplary network as directed graph.

FIG. 1 shows an exemplary model of a network 100 which is simplified for ease of explanation to demonstrate these terms. The simplified network 100 includes a plurality of nodes $N_1$-$N_8$, which are interconnected by edges $E_a$-$E_h$. Nodes 105 and 110 may be referred to as test points, which may be used to measure end-to-end performance effects as will be described in more detail below. While FIG. 1 illustrates the test points 105, 110 as being communication endpoints (or source/destination nodes) of network 100, one will appreciate that the test points may occur anywhere with network 100 and are not restricted to any location within the network topology.

There can be several different protocols that control data transfer between communication endpoints, with each protocol fulfilling a particular need. For example, the Transmission Control Protocol (TCP) may guarantee reliable and in-order delivery of data from a sender to receiver. On the other hand, the light-weight User Datagram Protocol (UDP) does not provide such guarantees. The Internet Control Message Protocol (ICMP) may be used primarily to report error messages through the network. The ICMP can define several types of packets, including the echo request and echo reply messages that may be commonly used by the ping utility, and the time-to-live exceeded and port unreachable messages that are critical parts of the traceroute utility. Details of some of these utilities will be presented in more detail below.

The protocols can also rely on one another. For example, the well-known Hyper Text Transfer Protocol (HTTP) is built on top of the TCP protocol, which is built on top of the Internet Protocol (IP). The Real-time Transport Protocol (or RTP) for delivering audio (such as VoIP) and video over the Internet, may be built on top of the UDP protocol since these applications do not require packets to be resent if they are initially dropped. Given the layered reliance of the aforementioned protocols, they may also be referred to as "layers."

In the context of modeling networks with directed graphs as shown in FIG. 1, the IP layer (layer 3 in the Open Systems Interconnection (OSI) standard), is the layer which may be most commonly modeled as a directed graph. Other OSI layers, for example layer 2, may also be placed in the context of a directed graph, which can include bridges and switches as nodes. Various embodiments of the invention presented herein may be widely applicable to any networking layer and are not restricted to the IP layer.

At the IP layer, a data path may include source and destination nodes (for example, modeled as test points 105 and 110), and a series of intervening routers (e.g., modeled as nodes $N_2$-$N_7$). Packets arriving at a router (or node) may be queued, and thus awaiting their transmission to the next router according to the packet's protocol as handled by the router. Physically, a queue may include a block of computer memory that temporarily stores the packets. If the queue (memory) is full when a packet arrives, it may be discarded. Otherwise, the packet is held until it reaches the front of the queue and is then forwarded to the next router on the way to its destination. This queuing mechanism may be responsible for observed packet losses and, to a large extent, for packet delays.

In many network applications, the packet delays and losses should be closely analyzed, monitored, and/or controlled to provide adequate service. VoIP, also known as IP telephony, may be considered one such application where controlling losses and delays is desirable. IP telephony may involve a pair of IP phones that exchange streams of packets which carry voice data. At a sending IP phone, the packets may be sent with regularity (for example, every 20 milliseconds) and each packet contains a segment of voice. At the receiving IP phone, the packets may not arrive with the same regularity because of unpredictable events in the network. The packets can be dropped by network routers when queues are full, they can be affected due to competing traffic, or they can arrive out of order. Packet loss and the lack of regularity in the packet stream at the receiving phone can result in poor sound quality.

Further referring to FIG. 1, the source and destination nodes (test points 105 and 110) may be conventional wired or wireless IP telephones (including devices commonly referred to as IP "softphones"), personal digital assistants (PDAs), mobile telephones, personal computers (PCs), single-board computers and/or any other type of devices capable of transferring data over a data network. Moreover, as mentioned previously, network 100 is greatly simplified for ease of explanation, and one should appreciate that embodiments of the invention are applicable to any type of communications network, such as, for example, a global communication network such as the Internet, a wide area network, a metropolitan area network, a local area network, a wireless cellular network, a public switched telephone network (PSTN), or a satellite network, as well as portions or combinations of these and/or other communication networks.

There are several existing data collection utilities that can be used to collect data on the performance of network connections and remote computers. Presented herein are the ping and traceroute utilities and their respective usefulness in collecting information about the network. Other network data collection techniques could be utilized within various embodiments of the invention. The ping utility is a tool used by system administrators to check if a remote computer is operating and to determine network connectivity. The source computer may send an ICMP packet to the remote computer's IP address. If the destination computer is up and the network connections are fine, it may receive a return an ICMP packet. Thus, one can collect data on roundtrip times and delays using the ping utility.

The traceroute utility is another source for collecting roundtrip times, although traditionally it may mostly be used to identify network topologies. Traceroute can send UDP packets from the source, and then exploit the time-to-live (TTL) field of a packet to determine the route that the packet takes to its destination. IP packets typically have a TTL field that can take on values between 0 and 255. When a router receives an IP packet, it may decrement this TTL field and forward the packet to its destination according to the router's routing table. If, however, the TTL field was already 0, the router may send back an ICMP packet, indicating TTL exceeded, to the source. Traceroute packets may be sent at increasing values of TTL, starting with 1, until the destination is actually reached. The source actually sends the traceroute packets to some invalid port at the destination. When the destination receives a packet destined for an invalid port, an ICMP packet indicating "Port unreachable" is typically sent back to the source to indicate the error. The source then knows the destination was reached. All the previous packets failed to reach the destination because the TTL was too small and the source received a TTL exceeded message from each of the intervening routers between the source and the destination, in the order in which they appear.

Many issues can arise when using traceroute and ping as data collection tools. Some routers may be configured to avoid sending ICMP messages or to not forward them. In addition, traceroute can produce false paths in the presence of per-packet load balancing which sends each successive packet on a different path. Traceroute typically does not directly identify the routers but only the IP addresses. Routers may have many IP addresses, for example, one IP address for each of their interfaces. When multiple paths are collected with traceroute, a given router may appear under different IP addresses in different paths. Thus, the traceroute and ping data can provide incomplete or inaccurate information. The biggest drawback with these data, however, is that the tools' protocols may be different from those used by the applications of interest (e.g., the VoIP application may utilize a variety of network protocols, such as, for example, UDP for bearer traffic, TCP for signaling, ICMP for administrative functionality, etc.), and hence the network routers may treat these packets differently. These drawbacks can limit the utility of traceroute and other known data collection utilities for directly deriving accurate estimates of network performance at the edge level. Therefore, information produced by traceroute may be referred to herein as "unrelated approximations" of edge level performance metrics.

Accordingly, embodiments of the invention address the problem of determining the performance of the network for a target application (e.g., VoIP) at the edge level by estimating the delays and/or packet loss for each individual edge (e.g., $E_a$-$E_h$ in FIG. 1) in the network. As used herein, the term "edge effects" may be used to represent performance metrics, including both edge delays and/or packet loss (specifically, log loss), for the edges within the network. The edge effects for a target application may be determined by partitioning the aggregate, or end-to-end effects for a target application, which may be directly measured at the test points (e.g., 105, 110) by generating and collecting end-to-end performance data corresponding to the target application. A description of the mathematical models associated with the embodiments is presented below.

Figure 2:
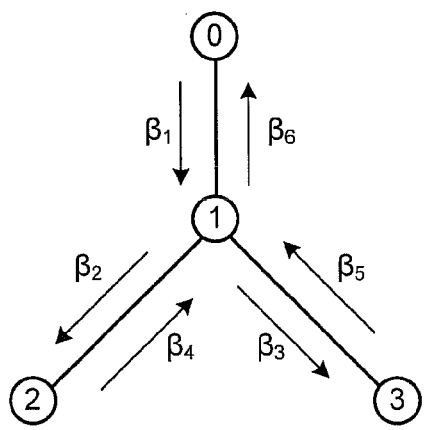
FIG. 2 shows a simplified exemplary network for illustrating a linear model.

FIG. 2 shows a simplified exemplary network 200 for illustrating the development of a linear model used with various embodiments of the invention. This model expresses end-to-end measurements as the sum of the edge effects for the edges on the paths of the corresponding measurements. Accordingly, delay and log loss are responses for which such an additive model may reasonably be expected to fit.

First, consider the case in FIG. 2 where a single source node 0 sends probes to the two receiver nodes 2 and 3. Let $\beta_1$, $\beta_2$, and $\beta_3$ be the one-way delays associated with the edges as shown in FIG. 2. Initially, we may assume these delays are fixed numbers. Let $Y_{<0,2>}$ and $Y_{<0,3>}$ denote the measured end-to-end delays associated with paths <0,2> and <0,3> respectively. Then $Y_{<0,2>}=\beta_1+\beta_2$ and $Y_{<0,3>}=\beta_1+\beta_3$. Letting y and $\beta$ be the corresponding vectors, we can write $y=R_1\beta+\epsilon$ where $R_1$ is the end-to-end routing matrix (shown in FIG. 2), with $R_{ij}=1$ if the $i^{th}$ path contains the $j^{th}$ edge, and zero otherwise. An error vector $\epsilon$ can reflect that the measurements may be subject to natural variations. A different measurement scheme may be used which sends probes from each end-point to all other end points as shown in FIG. 2. This can result in six edge level parameters corresponding to the two directions of the edges. There are also six end-to-end delays $Y_{<0,2>}$, $Y_{<0,3>}$, $Y_{<2,0>}$, $Y_{<2,3>}$, $Y_{<3,0>}$, and $Y_{<3,2>}$. The routing matrix may now be given by $R_2$ which is illustrated in FIG. 2. Again, a linear model of the form $y=R\beta+\epsilon$ results.

Another matrix which may be used in conjunction with the linear model is a partial path routing matrix T. In addition to the routing information found in R, T can also include the sequence information found within the network. The sequence information comes about from the determination of the partial paths along each of end-to-end paths. The partial path routing matrix T may contain a row for each device in an end-to-end path. The first row would contain a single one corresponding to the first device; the second row contains two ones corresponding to the first and second device in the path, and so on until the path is traversed, wherein the last row contains a set of ones corresponding to the total number of devices in the path. T is an expanded version of R, where the length of T is a collection of rows corresponding to the number of ones in the original row of R, and each row of T forms an increasing sequence of ones, that is, each row in T has one more one that the previous row. The last row of a block in T is the same as the corresponding original row in R.

An example of a partial path matrix routing matrix $T_1$, associated with the end-to-end routing matrix $R_1$, is shown in FIG. 2. $R_1$ has 2 rows corresponding to the end-to-end paths within the network 200 which are formed by source-destination pairs (0-2) and (0-3). In $T_1$ each row corresponds to a partial path wherein the successive rows in a block form an increasing sequence of ones. As used herein, a block is a single source-destination pair, and a sequence is a partial path within the source-destination pair.

In general, the formulation results in a linear inverse problem of the form $y=R\beta+\epsilon$ where the goal is to estimate the mean edge-level delays, $\beta$, from the end-to-end performance data, y. If the routing matrix R is of full rank, this is straightforward and can be solved using least squares, subject to the constraint that the $\beta$'s have to be non-negative. One can also use weighted least-squares that incorporates the variance-covariance structure of the error terms to get more efficient estimators.

In most cases, however, the end-to-end routing matrix R is not of full rank. Part of the degeneracy can arise from a "chaining" phenomenon where some edges are completely confounded with others. This degeneracy essentially means that R is an ill-conditioned matrix for which an inverse cannot be readily determined and this implies that if optimization algorithms are used, they will find infinitely many solutions. However, the low rank of R can be addressed through techniques known as "regularization." Regularization may introduce some additional information about the solution, such as, for example, an assumption on the smoothness and/or a bound on the norm, which augment the model so that a solution for the vector $\beta$ can be determined.

The linear model $y=R\beta+\epsilon$ may be solved using constrained optimization techniques. Such techniques may include, for example, a non-negative least squares algorithm. Solving the equation $y=R\beta$ can be performed numerically by minimizing $\|y-R\beta\|^2$. However, when R does not have full rank, the minimization has infinitely many solutions and in that case it may be advantageous to exploit some additional information about the solution, such as knowledge about the smoothness or a bound on the norm. In the linear model of the network described above, R does not usually have full rank, so one approach to obtain a solution may be to exploit an unrelated approximation ($\hat{\beta}_0$) of $\beta$. Further to this approach, we may define:

$$\hat{\beta}_{penalized} = \arg\min_{\beta<0}\|y-R\beta\|^2+\lambda\|\beta-\hat{\beta}_0\|^2$$

where $\hat{\beta}_{penalized}$ is a vector representing the estimate of edge effects for the target application, which can include the mean edge-level delays, $\beta$; $\hat{\beta}_0$ is a vector representing the unrelated approximation of edge effects; y is a vector representing the measured end-to-end performance data for the target application; R is the end-to-end routing matrix; $\lambda$ is a scalar regularization parameter; and $\beta$ is an unknown vector representing non-negative edge estimates for the target application.

The regularization term, $\lambda\|\beta-\hat{\beta}_0\|^2$, is based upon an unrelated approximation of edge effects $\hat{\beta}_0$ which can be derived from the traceroute data collection tool explained above. It should be appreciated that other data collections tools and/or combinations thereof may be utilized to determine $\hat{\beta}_0$. The regularization parameter $\lambda$ is a weighting term which can determine the emphasis placed upon $\hat{\beta}_0$. Values of $\lambda$ may be determined heuristically based upon how changes in $\lambda$ effect the solutions found for $\hat{\beta}_{penalized}$. It has been determined that good results may be obtained for values of $\lambda$ ranging from 0.00001 to 0.001.

A number of approaches may be used to derive $\hat{\beta}_0$ for use in the regularization term based upon data collected from traceroute. One approach involves solving another model, similar to the one presented above, using a non-negative least squares estimator having the form:

$$\hat{\beta}_{TR} = \arg\min_{\beta<0}\|z-T\beta\|^2$$

where $\hat{\beta}_{TR}$ is a vector representing the unrelated approximation of edge effects, z is a vector of the intermediate round trip times, T is the partial path routing matrix, and $\beta$ is an unknown vector representing non-negative edge estimates. The matrix T is an expanded version of the matrix R, and has full rank. Note that T is always of full rank and that $\hat{\beta}_{TR}$ is well defined. This is why $\hat{\beta}_{TR}$ may be estimated directly without having to be regularized. Details regarding the implementation of this approach are presented below in the description of FIG. 4.

The approach provided above to determine $\hat{\beta}_{TR}$ may be computationally intensive for real-world networks and can take a long time to compute. An alternative vector for $\hat{\beta}_0$ which may be computed quickly is called $\hat{\beta}_{pava}$. $\hat{\beta}_{pava}$ may be defined as the combination of differences of successive round trip times which may be determined from traceroute data after the data have been adjusted to form a non-decreasing sequence using an isotonic regression algorithm. One efficient isotonic regression algorithm is called a pool adjacent violators algorithm. This approach amounts to taking care of the non-negativity constraint on a path-by-path basis rather than addressing it using all of the data at once as is done with $\hat{\beta}_{TR}$. Further details for computing $\hat{\beta}_{pava}$ are provided below in the description of FIG. 5.

As described above, the edge effects may represent other performance metrics than simply time delays. For example, the model may be utilized to estimate the loss of packets occurring at edges within the network. Loss, like cumulative delay, can be assumed to form an increasing deteriorating sequence with the successive TTL values. Because packet loss along a path appears as a multiplicative effect, and not an additive one as assumed by the model, the logarithm of packet loss (herein referred to as "log loss") may be estimated by embodiments of the invention. This is because the multiplicative nature of packet loss is transformed into an additive effect by using the logarithm function. In actuality, the quantity which is estimated may be log(1+fractional packet loss) in order to avoid singularities when executing the algorithm. Using the model to predict log loss may utilize multiple runs of the traceroute operation to determine the unrelated approximation of edge effects $\hat{\beta}_0$. This may be accomplished by sending many packets (perhaps hundreds) through the test points for each TTL, and measuring the packet loss separately for each TTL which is sent. Once all of the data is collected for the TTLs (which may span the entire range from 0-255, or merely a subset thereof), isotonic regression may be performed to monotonically smooth the loss data. Afterwards, the log(1+monotonically smoothed fractional loss) may be computed as a vector to form $\hat{\beta}_0$.

In a most general form, an estimator of edge effects ($\hat{\beta}_{penalized}$) for a target application can be expressed as a function of y, R, z, and T:

$$\hat{\beta} = \Phi(y, R, z, T),$$

or more specifically, $$\hat{\beta} = \lim_{\lambda \to 0}\{\arg\min_{\beta>0}(\rho_1(y, R\beta) + \lambda\rho_2(z, T\beta))\},$$

where $\rho_1$ and $\rho_2$ are measures of discrepancies between the data and the model such as the common Euclidian distance. The $\rho$'s could also be any other known norm.

Another form of estimation may be expressed as:

$$\hat{\beta} = \Phi(y, R, \beta_0),$$

such as, more specifically, $$\hat{\beta} = \lim_{\lambda \to 0} \{\underset{\beta>0}{\operatorname{argmin}}(\rho_1(y, R\beta) + \lambda \rho_2(\beta_0, \beta))\},$$

where $\beta_0$ is any unrelated approximation of $\beta$ or simply some prior belief of what $\beta$ may be. This form also includes the case where the unrelated approximation $\hat{\beta}_0$ of $\beta$ is derived from z and T such as described above for $\hat{\beta}_{TR}$ and $\hat{\beta}_{pava}$. The limit $\lambda \to 0$ provides that the estimation of $\beta$ relies on the relevant data, namely y, insofar as it is possible. In practice, the value for $\lambda$ may be reduced in successive steps until the resulting estimator stops changing.

Embodiments of the invention to estimate edge effects for a target application may use any additive measure of quality given the linear nature of the model. However, these embodiments could be applied to metrics which are not known to be additive. When using such performance metrics, such as, for example, packet jitter, one may apply the model and test its effectiveness by inspecting the residual error. Essentially, the approach would be to apply the model and test to see if the additivity assumption is strongly violated, based upon the residual error.

Moreover, embodiments of the invention may further be generalized to determine the performance of a network based upon the effects of network components, which may include effects of the nodes themselves in addition to the edge effects. The network nodes may include such devices as routers, depending upon the level of the network being analyzed.

Figure 3:
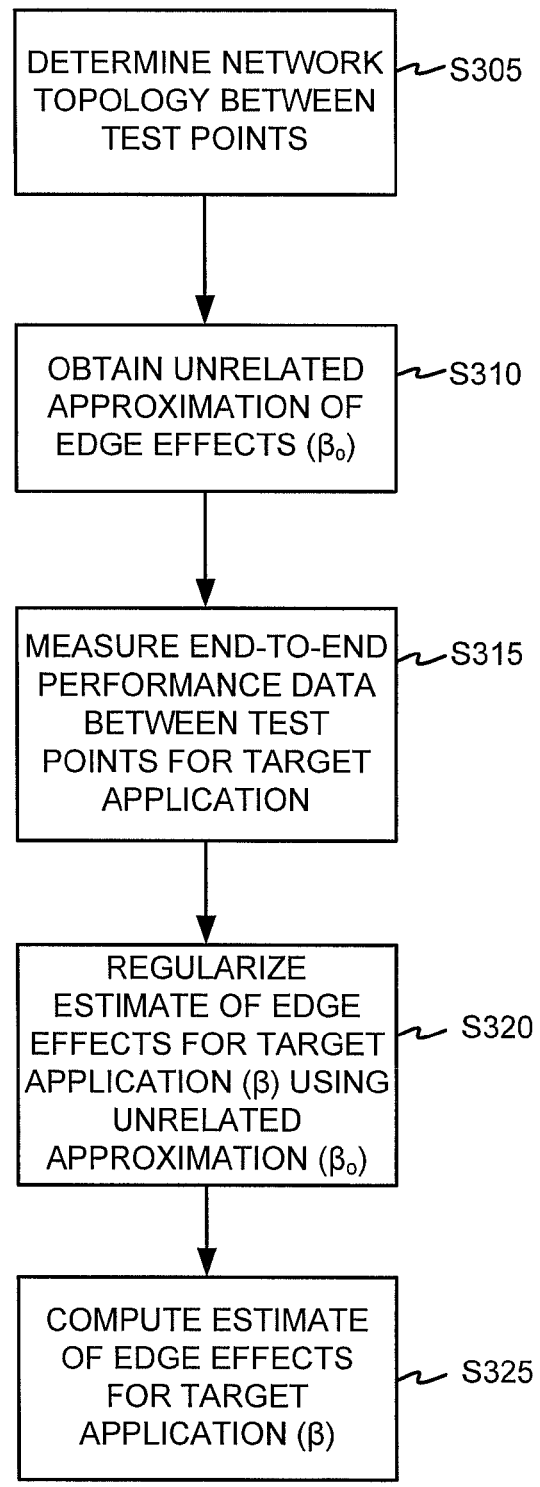
FIG. 3 depicts a flow diagram of an exemplary method for determining the edge effects for a target application within a network.

FIG. 3 depicts a flow diagram of an exemplary method for determining the edge effects for a target application within a network. The method may start out by determining the network topology between the test points (S305). One approach for determining the network topology can be to use the traceroute algorithm to map out all of the paths between the test points. This may be accomplished in a variety of ways using traceroute. One approach may be to run traceroute between every possible test point pair, so if there are N test points, a total of run $N^2$ traceroute sessions may be performed. The traceroute data typically includes a sequence of IP addresses and roundtrip times associated with the IP addresses. Because different an IP address may be associated with different interfaces of a single node, the IP addresses must first be merged to determine the device for which they are associated in order to obtain the network topology. The number of traceroute sessions may be reduced from $N^2$ by assuming the network is using the shortest paths. For example, if a network has a known path and a new pair of test points is being used, one can inspect the known topology and assume the network is using the shortest paths for packets to reach their destination. Other methods for network discovery other than trace route may be used. For example, an approach known as the simple network management protocol (SNMP) topology discovery may be used. Using SNMP commands, the routers within the network may be queried to provide a copy of their routing tables. Once a critical set of the routing tables are obtained from the routers, complete information regarding the topology of the network is known. Finally, the network topology may be determined based upon knowledge of a network which was manually constructed. These techniques for determining network topology are not exhaustive, and other known techniques may be used.

Further referring to FIG. 3, the next step in the process may be to obtain an unrelated approximation of the edge effects ($\hat{\beta}_0$) between the test points (S310). As presented above, this unrelated approximation can utilize data which are collected using protocols which may be different from the actual target application. There may be a number of quantities which can be used for $\hat{\beta}_0$ for various embodiments of the invention. Two options are presented in FIG. 4 and FIG. 5. Each of these options may also utilize the traceroute operation as a basis for determining $\hat{\beta}_0$. A measurement of the end-to-end performance data may then be performed by collecting data associated with the target application at the test points (S315). If there are N test points, this may be exhaustively accomplished by making $N^2$ measurements between all the test points. However, such an exhaustive approach may not be required, and the number of measurements performed by be bounded based upon the rank of the end-to-end routing matrix R. As described above, each measurement of end-to-end performance adds an additional row to R, which, up to a point, can have the effect of increasing the rank of R. The rank of R can be easily calculated, and therefore be used as an indicator as to when to stop collecting end-to-end performance data within the set of $N^2$ combination of test point pairs. The test point pairs may also be selected on the basis of optimizing or maximizing the rank of R. This may be accomplished by two approaches. The first approach can include having test point pairs which may be picked at random within the $N^2$ set of test point pairs, and an ongoing computation of the rank of R can be performed. When the rank of R stabilizes, or for example, reaches the point of diminishing returns, the collection of end-to-end performance data may cease. The second approach may include picking the test point pairs in such a way so that the rank of R climbs as quickly as possible. In this manner, one can experimentally determine the set of test point pairs which produces the largest rank. An ongoing computation of rank may be used to determine the utility of the next measurement, and server as an indicator of when to cease collecting data.

By using the linear model presented above, the estimate of edge effects for the target application $\hat{\beta}_{penalized}$ can be regularized by using the unrelated approximation of edge effects ($\hat{\beta}_0$) (S320). Once regularized, the estimate of edge effects for the target application ($\hat{\beta}_{penalized}$) may be computed to partition the end-to-end effects for the target application (S325). Because the network model is linear, a constrained linear optimization algorithm may be used, such as, for example, a non-negative least squares algorithm.

Figure 4:
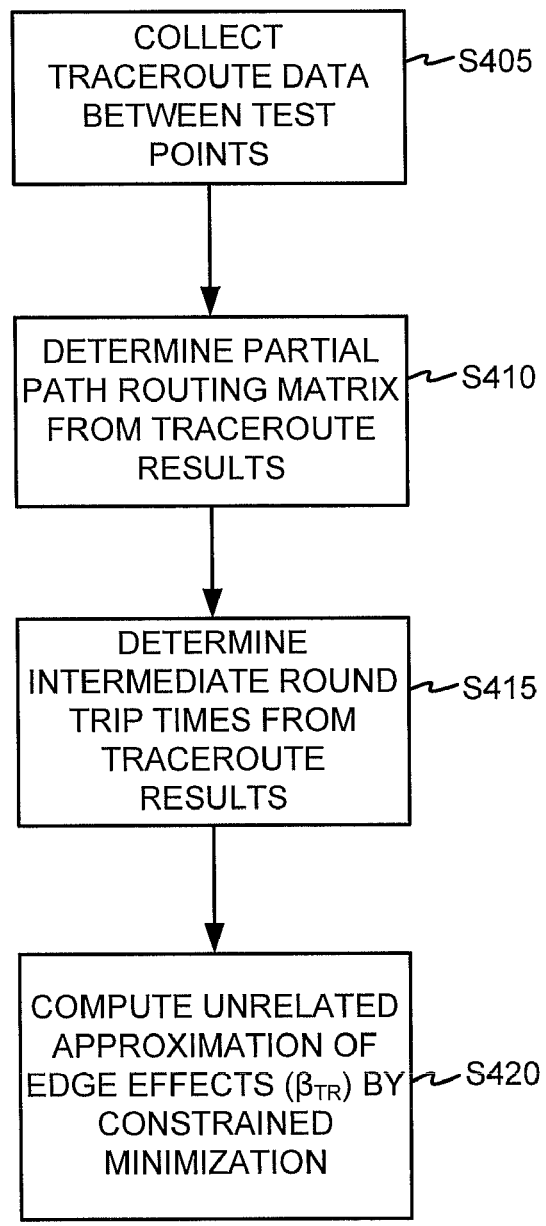
FIG. 4 shows a flow diagram of an exemplary method for determining an unrelated approximation of edge effects using constrained minimization.

FIG. 4 shows a flow diagram of an exemplary method 400 for determining an unrelated approximation of edge effects $\hat{\beta}_{TR}$ using constrained minimization. This embodiment may start by collecting traceroute data between test points (S405). One should appreciate that the traceroute data collected in step S305 described above in FIG. 3 may be used for the purposes of method 400 also, so independent traceroute operations may not be necessary which can advantageously improve the efficiency of the process. Method 400 may then determine the partial path routing matrix T using the traceroute data (S410). The structure of T contains sequencing information that is not present in the matrix R. Next, the method may determine the intermediate round trip times z, which may also be determined using the previously collected traceroute data (S415). The vector z may be determined directly from the traceroute round trip times. Finally, the unrelated approximation of edge effects $\hat{\beta}_0$ may be computed using constrained minimization to produce $\hat{\beta}_{TR}$ (S420). Again, because of the positivity constraints of the edge effects, a non-negative linear least squares algorithm may be used to compute $\hat{\beta}_{TR}$.

Figure 5:
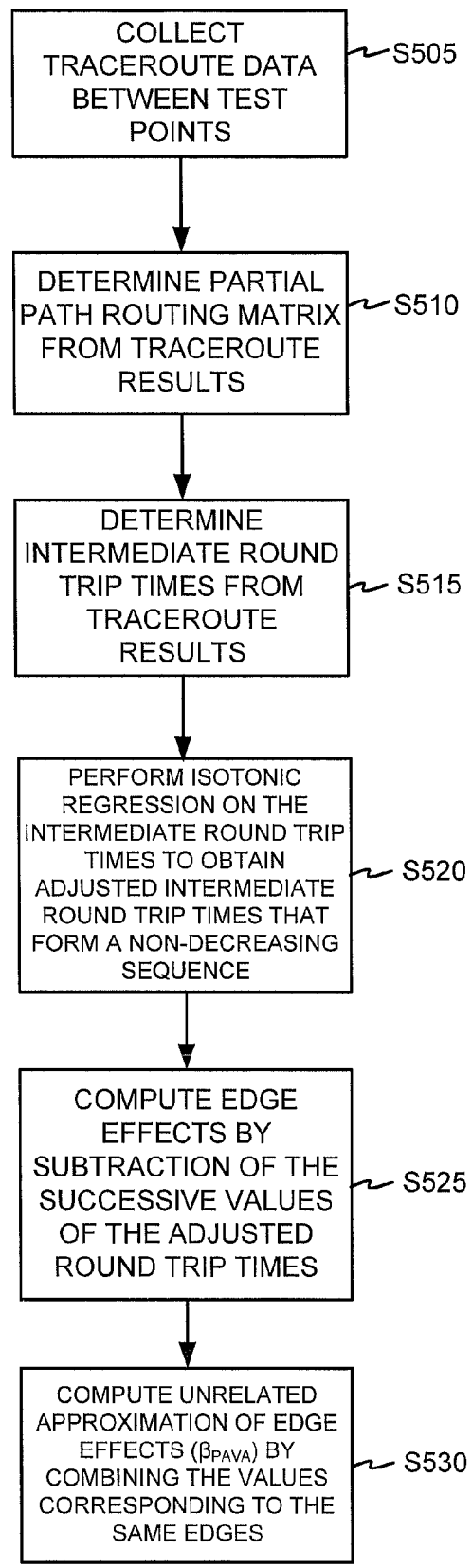
FIG. 5 depicts a flow diagram of an exemplary method for determining an unrelated approximation of edge effects using isotonic regression.

FIG. 5 depicts a flow diagram of an exemplary method 500 for determining an unrelated approximation of edge effects using isotonic regression $\hat{\beta}_{pava}$. This embodiment may start by collecting traceroute data between test points (S505). As in the previous embodiment discussed in FIG. 4, one should appreciate that the traceroute data collected in the process described above in FIG. 3 may be used for this purpose also, so an independent traceroute operation may not be necessary. Method 500 may then determine the partial path routing matrix T using the traceroute data (S510). Next, the method may determine the intermediate round trip times z, which may also be determined using the previously collected traceroute data (S515). An isotonic regression algorithm may then be performed on the round trip times z data to form a non-decreasing sequence (S520). One such algorithm which is very efficient for this task is the pool adjacent violators algorithm (pava). The pava algorithm ensures that the delays produced by traceroute are monotonically smoothed such that successive differences between adjacent hops are non-negative. Negative differences may result from a variety of real world effects, which can include packet reversals of the traceroute packets. The method may continue by computing edge effects by subtraction of the successive values of the monotonically smoothed round trip times z (S525). Method 500 may then compute the unrelated approximation of edge effects $\hat{\beta}_{pava}$ by combining values corresponding to the same edges (S530). Combining such values may be thought of as removing redundant results. The combination may be performed by any type of filtering, such as, for example, averaging or by median filtering. These redundant results can occur from overlapping edges occurring within different paths of the network.

FIG. 6 shows pseudo-code for an exemplary method of determining edge effects for a target application. This embodiment utilized traceroute to determine a variety of parameters which may be used within the network tomography algorithm. Initially, the method starts out with a set S of test points which may be selected manually by a network engineer/technician. The test points may be selected in a variety of ways, which include: 1) looking at components relevant to the target application within the path; 2) by the relative importance of the path within the network, which may be based upon who the path connects, or what type of information is expected to be carried over the path; 3) look at components which are known to be vulnerable or troublesome, perhaps due to reliability of the components themselves, or due to external considerations which may physically affect the network (e.g., weather, propensity to vandalism or sabotage, etc.). As described earlier, the selection can also be based upon a computation (such as, for example, the optimization) of the rank of R.

In STEPS 1 and 2, two test points a and b may be selected from S, and a traceroute is performed from a to b. It should be appreciated the direction of the traceroute packets may be significant for the analysis and localization of problems within the network. For the mere detection of problems, the direction of traceroute is not as critical. The traceroute results may be used to compute the partial path routing matrix T, the end-to-end routing matrix R, and the unrelated approximation of edge effects ($\hat{\beta}_0$). In STEP 3, for test points a and b, the measurement is made to determine the end-to-end performance data for the target application (y). In STEP 4, the estimate of edge effects for the target application ($\hat{\beta}_{penalized}$) may be computed by a non-negative least squares algorithm. Another embodiment of the invention may be used in the context of a monitoring system. The monitoring system may carry out STEPS 1-4 repetitively. However, each of the above quantities do not have to be carried out with the same frequency. The end-to-end routing matrix R, and the unrelated approximation of edge effects ($\hat{\beta}_0$) could be refreshed at a given period (e.g., every hour) while fresh end-to-end performance data for the target application (y) and edge effects for the target application ($\hat{\beta}_{penalized}$) could be obtained with a higher frequency.

Figure 7:
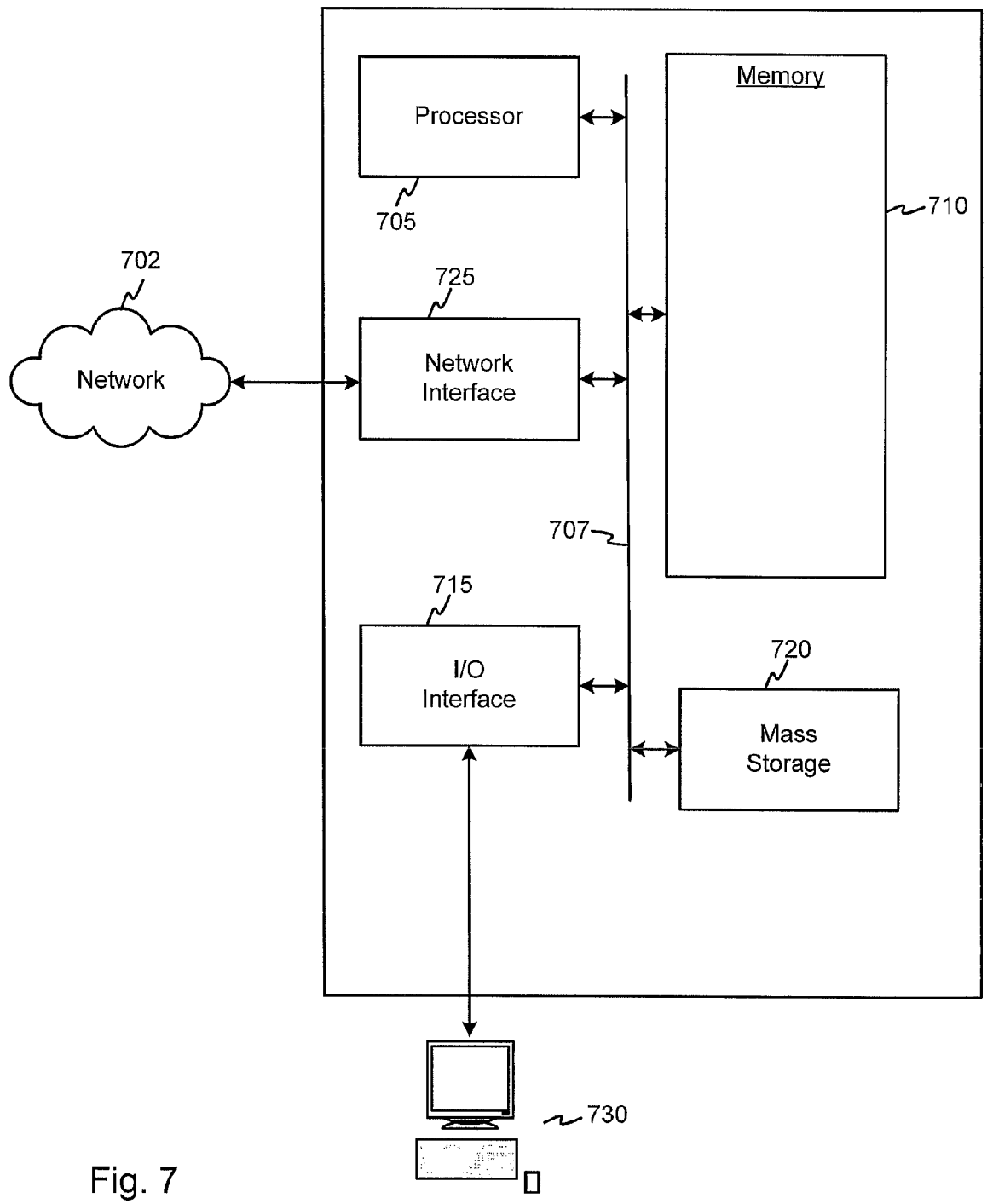
FIG. 7 illustrates an exemplary computer which may be used to performing methods described herein.

FIG. 7 illustrates a block diagram of an exemplary computer 700 consistent with another embodiment of the invention. The computer 700 may include a processor 705, a system bus 707, a mass storage unit 720, an I/O interface 715, a memory unit 710, and a network interface 725. The processor 705 may interface with memory 710 and the mass storage unit 720 via the system bus 707. The memory 710 and/or the mass storage unit 720 may contain executable instructions and data for implementing various operations for performing the network analysis and/or monitoring methods described herein. The network interface 725 may interface with the processor 705 over the system bus 707, and can provide an interface for communication with the network 702. The I/O interface 715 may be provided to permit a user to interface to the computer 705 via user interface 730. The computer 705 may be any type of computer utilizing any operating system. For example, the processor 705 may be an x86 based CPU, and utilize any operating system which may include varieties of the Windows, Unix and/or Linux operating systems. The computer 700 may also use high-level analysis software packages and/or custom software written in any programming and/or scripting languages. Alternatively, the computer 705 may be implemented as special purpose hardware.

Although detailed embodiments and implementations of the present invention have been described above, it should be apparent that various modifications are possible without departing from the spirit and scope of the present invention.

What is claimed is:

1. A method for partitioning end-to-end performance effects within a network, comprising:
    determining a network topology between at least two test points;
    obtaining an unrelated approximation of edge effects between the test points;
    measuring end-to-end performance data between the test points corresponding to a target application;
    regularizing an estimate of edge effects for the target application using the unrelated approximation of edge effects; and
    computing the estimate of edge effects for the target application to partition the end-to-end effects.

2. The method according to claim 1, further comprising:
    collecting traceroute data between the at least two test points;
    utilizing the traceroute data to determine an end-to-end routing matrix and the unrelated approximation of edge effects; and
    performing a constrained optimization of a first mathematical model which relates the estimate of edge effects for the target application with the end-to-end routing matrix and the end-to-end performance data.

3. The method according to claim 2, wherein the constrained optimization of the first mathematical model includes a non-negative least squares algorithm.

4. The method according to claim 1, wherein the obtaining the unrelated approximation further comprises:

collecting traceroute data between the at least two test points;

determining a partial path routing matrix based upon the traceroute data;

determining intermediate round trip times based upon the traceroute data;

performing isotonic regression on the intermediate round trip times to obtain a non-decreasing sequence;

computing edge effects by subtraction of successive results of the non-decreasing sequence; and combining the edge effects of values which correspond to a same edge to remove redundant measurements.

5. The method according to claim 4, wherein the performing isotonic regression further comprises:

monotonically smoothing the intermediate round trip times using a pool adjacent violators algorithm.

6. The method according to claim 4, wherein the combining further comprises:

computing an average or a median value to combine the redundant measurements.

7. The method according to claim 1, wherein the obtaining the unrelated approximation of edge effects further comprises:

collecting traceroute data between the at least two test points;

determining a partial path routing matrix using the traceroute data;

determining intermediate round trip times using the traceroute data; and computing the unrelated approximation of edge effects based upon the partial path routing matrix and the intermediate round trip times.

8. The method according to claim 7, wherein the computing the unrelated approximation of edge effects further comprises:

performing a constrained optimization of a second mathematical model which relates the unrelated approximation of edge effects with the partial path routing matrix and the intermediate round trip times.

9. The method according to claim 8, wherein the second mathematical model is $$\hat{\beta}_{TR} = \arg\min_{\beta>0} \|z - T\beta\|^2$$

where $\hat{\beta}_{TR}$ is a vector representing the unrelated approximation of edge effects, z is a vector of the intermediate round trip times, T is the partial path routing matrix, and β is an unknown vector representing non-negative edge estimates.

10. The method according to claim 8, wherein the constrained optimization includes a non-negative least squares algorithm.

11. The method according to claim 2, wherein the first mathematical model is $$\hat{\beta}_{penalized} = \arg\min_{\beta>0} \|y - R\beta\|^2 + \lambda \|\beta - \hat{\beta}_0\|^2$$

where $\hat{\beta}_{penalized}$ is a vector representing the estimate of edge effects for the target application, $\hat{\beta}_0$ is a vector representing the unrelated approximation of edge effects, y is a vector representing the measured end-to-end performance data for the target application, R is the end-to-end routing matrix, λ is a scalar regularization parameter, and β is an unknown vector representing non-negative edge estimates for the target application.

12. The method according to claim 11, wherein the regularization parameter is between 0.00001 and 0.001.

13. The method according to claim 1, wherein the determining a network topology further comprises:

collecting traceroute data between the at least two points;

reducing the traceroute data to determine edges which comprise at least one path between the at least two points; and creating an end-to-end routing matrix based upon the reduced traceroute data.

14. The method according to claim 1, wherein the application includes Voice over Internet Protocol (VoIP) Telephony.

15. The method according to claim 2, further comprising:

determining the selection of test points based upon a computation of rank of the end-to-end routing matrix.

16. The method according to claim 2, further comprising:

determining fractional packet loss for each TTL value based upon the traceroute data to produce a loss vector;

performing isotonic regression on the loss vector; and computing a logarithmic transformation on the isotonically regressed loss vector.

17. The method according to claim 1, wherein the method is used to determine the performance of a network based upon effects of nodes.

18. A method for determining an unrelated approximation of edge effects within a network, comprising:

collecting traceroute data between at least two test points;

determining a partial path routing matrix based upon the traceroute data;

determining intermediate round trip times based upon the traceroute data;

performing isotonic regression on the intermediate round trip times to obtain a non-decreasing sequence;

computing edge effects by subtraction of successive results of the non-decreasing sequence; and combining the edge effects of values which correspond to a same edge to remove redundant measurements.

19. The method according to claim 18, wherein the performing isotonic regression further comprises:

monotonically smoothing the traceroute data using a pool adjacent violators algorithm.

20. The method according to claim 18, wherein the combining further comprises:

computing an average or a median value to combine the duplicate measurements.

21. A method for partitioning end-to-end effects within a network, comprising:

collecting traceroute data between the at least two test points;

determining an end-to-end routing matrix between at least two test points using the traceroute data;

obtaining an unrelated approximation of edge effects between the test points using the traceroute data;

measuring end-to-end performance data between the test points corresponding to a target application; and computing an estimate of edge effects for the target application by utilizing the unrelated approximation of the edge effects as a regularization term.

22. The method according to claim 21, wherein the obtaining the unrelated approximation further comprises:

monotonically smoothing the traceroute data using a pool adjacent violators algorithm; and combining the smoothed traceroute data to remove duplicate measurements resulting from edges appearing multiple times within a path between the test points.

23. The method according to claim 22, wherein the combining further comprises:
  computing an average or a median value to combine the duplicate measurements.

24. The method according to claim 21, wherein the obtaining the unrelated approximation of edge effects further comprises:
  determining a partial path routing matrix using the traceroute data;
  determining intermediate round trip times using the traceroute data; and
  computing the unrelated approximation of edge effects based upon the partial path routing matrix and the intermediate round trip times.

25. An apparatus for partitioning end-to-end performance effects within a network, comprising:
  a memory storing a set of instructions; and
  a processor executing the stored set of instructions for
    determining a network topology between at least two test points,
    obtaining an unrelated approximation of edge effects between the test points,
    measuring end-to-end performance data between the test points corresponding to a target application,
    regularizing an estimate of edge effects for the target application using the unrelated approximation of edge effects, and
    computing the estimate of edge effects for the target application to partition the end-to-end effects.

* * * * *